US012617481B2

(12) United States Patent (10) Patent No.: US 12,617,481 B2

Calia et al. (45) Date of Patent: May 5, 2026

(54) SUPPORT ROLLER FOR VEHICLE TRACKS

(71) Applicant: ITALTRACTOR ITM S.P.A., Fraz. Crespellano (IT)

(72) Inventors: Eustachio Calia, Matera (IT); Adriano Bellini, Modena (IT); Askar Echamanov, Frazione Gambulaga (IT)

(73) Assignee: ITALTRACTOR ITM S.P.A.

( * ) Notice: Subject to any disclaimer, the term of this patent is extended or adjusted under 35 U.S.C. 154(b) by 1108 days.

(21) Appl. No.: 17/594,990

(22) PCT Filed: May 6, 2019

(86) PCT No.: PCT/IT2019/000032

§ 371 (c)(1),
(2) Date: Nov. 4, 2021

(87) PCT Pub. No.: WO2020/225833

PCT Pub. Date: Nov. 12, 2020

(65) Prior Publication Data

US 2022/0250696 A1 Aug. 11, 2022

(51) Int. Cl.
B62D 55/14 (2006.01)

(52) U.S. Cl.
CPC .................................... B62D 55/14 (2013.01)

(58) Field of Classification Search
CPC ....... B62D 55/14; B62D 55/15; B62D 55/145
(Continued)

(56) References Cited

U.S. PATENT DOCUMENTS 3,147,048 A 9/1964 Alvar et al.
3,154,958 A 11/1964 Cadwell et al.
(Continued)

FOREIGN PATENT DOCUMENTS

CN 202089136 U * 12/2011 ............. B62D 55/14
CN 104340289 A * 2/2015 ............. B62D 55/14
(Continued)

OTHER PUBLICATIONS

Japanese Official Action dated May 30, 2023, issued in corresponding Japanese application.
(Continued)

*Primary Examiner* — S. Joseph Morano
*Assistant Examiner* — Eva L Comino
(74) *Attorney, Agent, or Firm* — Husch Blackwell LLP

(57) ABSTRACT

A support roller for vehicle tracks, includes a tubular body rotatable on a supporting shaft integral with a chassis; the tubular body has an external surface for accommodating a portion of an internal face of a respective chain. The supporting shaft comprises at least three consecutive cylindrical segments having constant external diameters and increasing progressively from one segment to the next. The tubular body comprises an internal cavity provided with a first portion whose dimensions are complementary to the segment of said shaft that has the largest diameter and an intermediate portion, which in the assembly configuration faces and is proximate to a segment of the shaft having an intermediate diameter; the intermediate portion has a different diameter than the first portion. An annular interspace that accommodates rolling elements is formed between the segment having an intermediate diameter of the supporting shaft and the intermediate portion of the tubular body.

11 Claims, 3 Drawing Sheets

(58) Field of Classification Search
USPC .......................................................... 301/136
See application file for complete search history.

(56) References Cited

U.S. PATENT DOCUMENTS

| | | | | |
|---|---|---|---|---|
| 3,869,931 | A * | 3/1975 | Boggs .................. | B62D 55/145 474/151 |
| 4,695,102 | A * | 9/1987 | Crotti .................. | B62D 55/092 305/136 |
| 5,040,855 | A | 8/1991 | Diekevers | |
| 9,840,291 | B2 * | 12/2017 | Kita ..................... | B62D 55/092 |
| 2004/0084961 | A1 * | 5/2004 | Yamamoto ............. | B62D 55/14 305/136 |
| 2015/0284042 | A1 * | 10/2015 | Kalmes .................. | B62D 55/15 305/107 |
| 2016/0121945 | A1 * | 5/2016 | Rust ....................... | B62D 55/14 305/15 |
| 2016/0236735 | A1 * | 8/2016 | Kita ..................... | B62D 55/145 |
| 2019/0047643 | A1 * | 2/2019 | Gustafson ............ | B62D 55/145 |

FOREIGN PATENT DOCUMENTS

| | | | | | |
|---|---|---|---|---|---|
| CN | 204775565 | U | * | 11/2015 | ........... B62D 55/088 |
| DE | 3540312 | A1 | * | 11/1985 | ........... B62D 5/5104 |
| DE | 102013221287 | B4 | * | 12/2018 | ........... B60B 35/005 |
| JP | 49072837 | A | | 7/1974 | |
| JP | 10196648 | A | | 7/1998 | |

OTHER PUBLICATIONS

Chinese Official Action dated Apr. 14, 2023, issued in corresponding Chinese application.

* cited by examiner

SUPPORT ROLLER FOR VEHICLE TRACKS

CROSS REFERENCES

This application is a U.S. National Phase Application of International Application No. PCT/IT/2019/000032 filed on May 6, 2019, the disclosure of which is incorporated herein by reference in its entirety.

TECHNICAL FIELD

The present invention relates to a support roller for vehicle tracks.

BACKGROUND

Vehicles provided with tracks for transmitting the motion from the engine to the ground have widespread use. The use of tracked vehicles is preferred in environments in which traction is problematic.

All the components of the vehicle that are necessary and support motion transmission between the reduction unit and the ground are known as undercarriage components and comprise: chain, driving wheel, track tensioning wheel, lower rollers, and upper rollers.

During operation, the chain is assembled on the vehicle, forming a continuous structure that is closed onto itself, wound between two or more wheels arranged at a given operating center distance and guided by a variable number of rollers. The wheel that transmits motion from the engine to the chain is known as sprocket or tumbler. This component can be constituted monolithically or by a plurality of segments. There is also at least one idle wheel or track tensioning guiding wheel, for closing the winding of the chain. The chain, in its upper portion, can be supported by one or more rollers, termed upper rollers. The lower portion is instead supported by the lower rollers. The vertical loads produced by chain-vehicle interaction are transmitted to the chassis of said vehicle by means of the lower rollers.

A roller, during its operation inside a tracked vehicle, is subjected to mechanical stresses caused by axial and radial loads generated by the interaction of the weight of the vehicle with the outside environment. Various solutions are currently used in order to absorb these loads and avoid misalignments which might compromise the correct motion of the chain.

One of these solutions is to arrange bearings between the components of the roller.

A solution with the use of bearings, despite providing good responses from the functional standpoint, on the other hand has high costs for the components, for assembly and for machining of the components that constitute the seat of the bearings.

An alternative solution to the use of bearings is to interpose a sliding bushing between the shaft that supports the roller and the roller itself.

In order to lower the friction coefficient, bear the loads and dissipate the heat, lubrication may be present in both solutions (bearings and sliding bushings). The most widespread lubrication system in design and construction practice is the oil bath type. Circulation of the lubricant therefore occurs by sloshing during the rolling motion of the roller with respect to the shaft. During this motion, the lubricant creates a supporting film between the shaft and the roller body, thus achieving the physical separation of the two components, reducing friction drastically and therefore allowing the correct operation of the roller.

Seals are used to then avoid the leakage of the lubricant from the roller assembly by creating, between the roller and the corresponding supporting shaft, a containment chamber that is hermetic and closed toward the outside. The constructive choices for the seals are various. Mechanical seals with a front rotating seal, known as Duo-Cone, are generally used. The seals, in addition to achieving the task of avoiding the leakage of lubricant, are often able to withstand more or less substantial axial plays, vibrations, impacts, and to protect the inside of the roller from the presence of abrasive and corrosive materials and from environmental conditions with extreme temperatures.

As regards the roller body, it is often provided by joining two parts, commonly known as roller halves. This joining is performed, in most cases, by welding, an operation which can cause a degradation of the performance of the welded materials due to the modification of the micrographic and mechanical characteristics of the materials themselves as well as a more or less extensive geometric deformation of the roller half proximate to the weld.

SUMMARY

The aim of the present invention is to solve the problems described above, proposing a support roller for vehicle tracks that does not require lubrication.

Within the scope of this aim, an object of the invention is to propose a support roller for vehicle tracks constituted by low-cost components.

Another object of the invention is to propose a support roller for vehicle tracks that is suitable to bear intense loads.

A further object of the invention is to propose a support roller for vehicle tracks that is scarcely subject to wear.

A further object of the present invention is to provide a support roller for vehicle tracks that has low costs, is relatively simple to provide in practice and is safe in application.

This aim and these objects, as well as others which will become better apparent hereinafter, are achieved by a support roller for vehicle tracks, of the type comprising at least one tubular body which can rotate on a supporting shaft which is integral with a chassis of a vehicle, said at least one tubular body being provided with at least one external surface for the temporary accommodation of a portion of an internal face of a respective chain, characterized in that said supporting shaft comprises at least three consecutive cylindrical segments, having external diameters which are constant and increase progressively from one segment to the next; said at least one tubular body comprises a cylindrical internal cavity provided with at least one first portion whose shape and dimensions are complementary to those of said segment of said shaft having the largest diameter and at least one intermediate portion, which faces and is proximate to, in the assembly configuration, a said segment of said shaft having an intermediate diameter, said intermediate portion having a different diameter than said first portion; an annular interspace for the accommodation of a plurality of rolling elements such as rollers, barrels, balls and the like being formed between said segment having an intermediate diameter of said supporting shaft and said at least one intermediate portion of said tubular body.

BRIEF DESCRIPTION OF THE DRAWINGS

Further characteristics and advantages of the invention will become better apparent from the description of a preferred but not exclusive embodiment of the support roller for vehicle tracks according to the invention, illustrated by way of nonlimiting example in the accompanying drawings, wherein.

DETAILED DESCRIPTION

Figure 1:
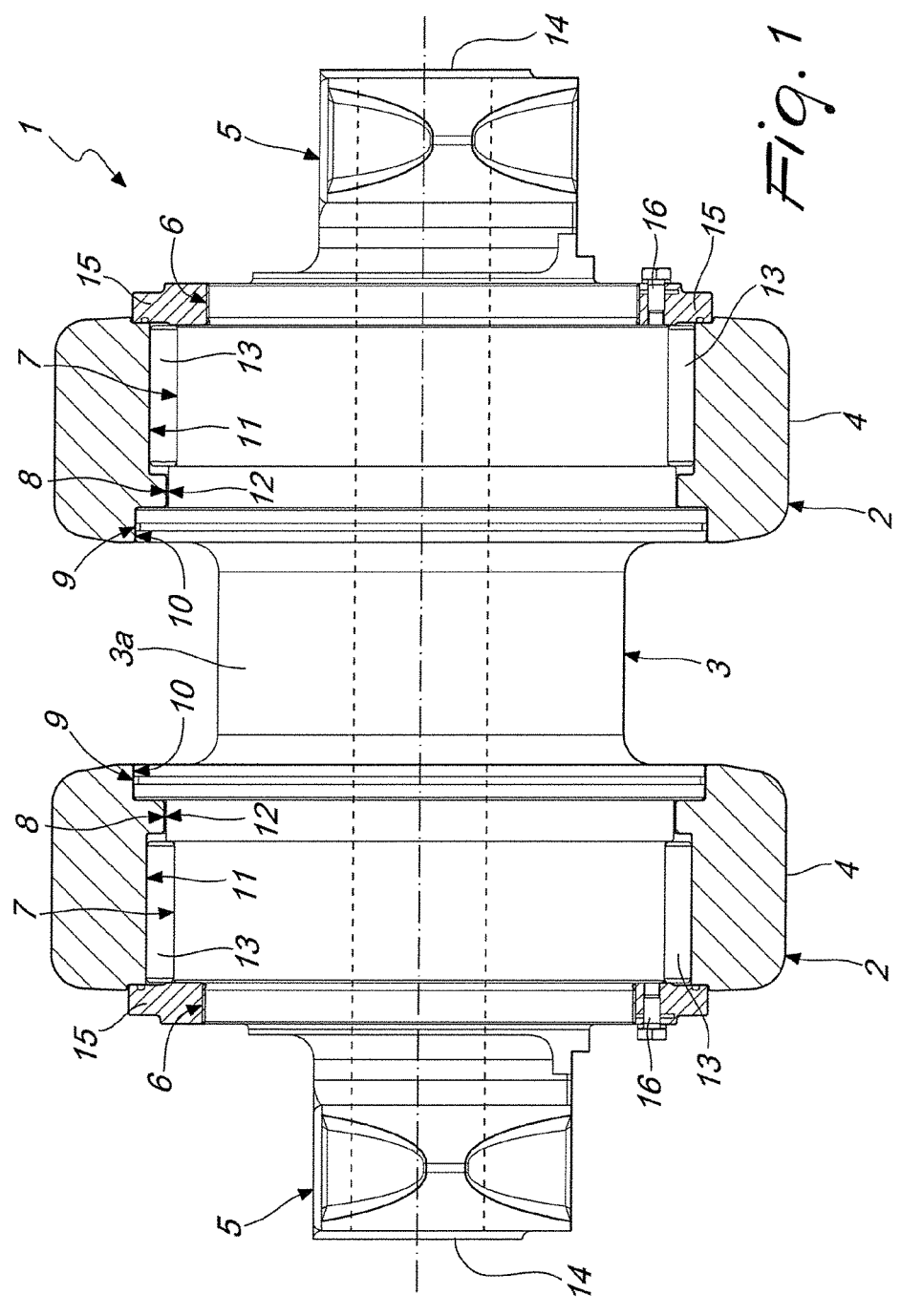
FIG. 1 is a sectional view, taken along a longitudinal plane, of a first version of a support roller for vehicle tracks according to the invention.

With particular reference to the figures cited above, the reference numeral 1 generally designates a support roller for vehicle tracks.

The support roller 1 according to the invention comprises at least one tubular body 2, which can rotate on a supporting shaft 3 which is integral with a chassis of a vehicle.

The at least one tubular body 2 is provided with at least one external surface 4 for the temporary accommodation of a portion of an internal face of a respective chain (track chain).

The supporting shaft 3 comprises at least three consecutive cylindrical segments 5, 6, 7, 8, 9 whose outside diameters are constant and increase progressively from one segment 5, 6, 7, 8, 9 to the next.

The at least one tubular body 2 comprises a cylindrical internal cavity provided with at least one first portion 10 whose shape and dimensions are complementary to those of the segment 8 or 9 of the shaft 3 having the largest diameter and with at least one intermediate portion 11 which faces and is proximate to, in the assembly configuration, a segment 7 or 8 of the shaft 3 having an intermediate diameter.

The intermediate portion 11 has a different diameter with respect to the first portion 8 or 9.

An annular interspace for accommodating a plurality of rolling elements 13, such as rollers, barrels, balls and the like, is formed between the portion 7 or 8 of intermediate diameter of the supporting shaft 3 and the at least one intermediate portion 11 of said tubular body 2.

With particular reference to embodiments of the present invention of assured interest in practice and in application, it is specified that the supporting shaft 3 can advantageously be symmetrical with respect to a central plane that is transverse and perpendicular to the rotation axis.

In this case, the shaft 3 comprises respective symmetrical external contoured regions, each provided with at least three consecutive cylindrical segments 5, 6, 7, 8, 9, whose outside diameters are constant and increase progressively from one segment 5, 6, 7, 8, 9 to the next.

Within the scope of these embodiments, the symmetrical contoured regions are mutually blended by a cylindrical central portion 3a.

Also within the scope of the preferred embodiments described previously, it is specified that advantageously the tubular body bodies 2 can be two, arranged symmetrically on a respective supporting shaft 3.

Each tubular body 2, in this case, conveniently comprises a respective cylindrical internal cavity provided with the at least one first portion 10 and with the at least one intermediate portion 11.

In an embodiment of the present invention (illustrated merely by way of nonlimiting example in FIG. 1) the shaft 3 advantageously comprises: two terminal ends 5, which constitute a first segment 5, are intended for mating with the chassis of the vehicle, and have a first diameter; at least one second cylindrical segment 6, which is blended with the region furthest from its end front 14 of one of the terminal ends, which has a second diameter that is larger than the first diameter; at least one third cylindrical segment 7, which is blended with the second segment 6 and has a third diameter that is larger than the second diameter; at least one fourth cylindrical segment 8, which is blended with the third segment 7 and has a fourth diameter that is larger than the third diameter, at least one fifth cylindrical segment 9, which is blended with the fourth segment 8 and has a fifth diameter that is larger than the fourth diameter.

With particular reference to the embodiment described above, it is specified that the internal cavity of each tubular body 2 comprises advantageously: the first portion 10, whose shape and dimensions are complementary to those of the fifth segment 9 of the shaft 3; a second portion 12, whose shape and dimensions are complementary to those of the fourth segment 8 of the shaft 3; the intermediate portion 11, which in the assembly configuration faces and is proximate to the third segment 7 of the shaft.

With specific reference to the constructive solution described so far, it is specified that the roller 1 usefully comprises at least one closure flange 15, which can be coupled rigidly to the second segment 6 of the shaft 3, for locking the rolling elements 13 within the interspace defined between the tubular body 2 and the supporting shaft 3, consequently preventing the axial translational motions of the tubular body 2.

The mutual mating of the flange 15 with the second segment 6 of the shaft can be of the threaded type: if the segment 6 has an external thread and the flange 15 has a female thread that is complementary thereto, it is in fact possible to screw the flange 15 onto the segment 6. Accidental unscrewing of the flange can be prevented by using methods of a known type.

The accompanying FIG. 1 shows the possibility to insert a threaded element 16 in a hole (likewise threaded) of the flange 15 to lock the flange 15 in the configuration for full screwing onto the segment 6.

Figure 2:
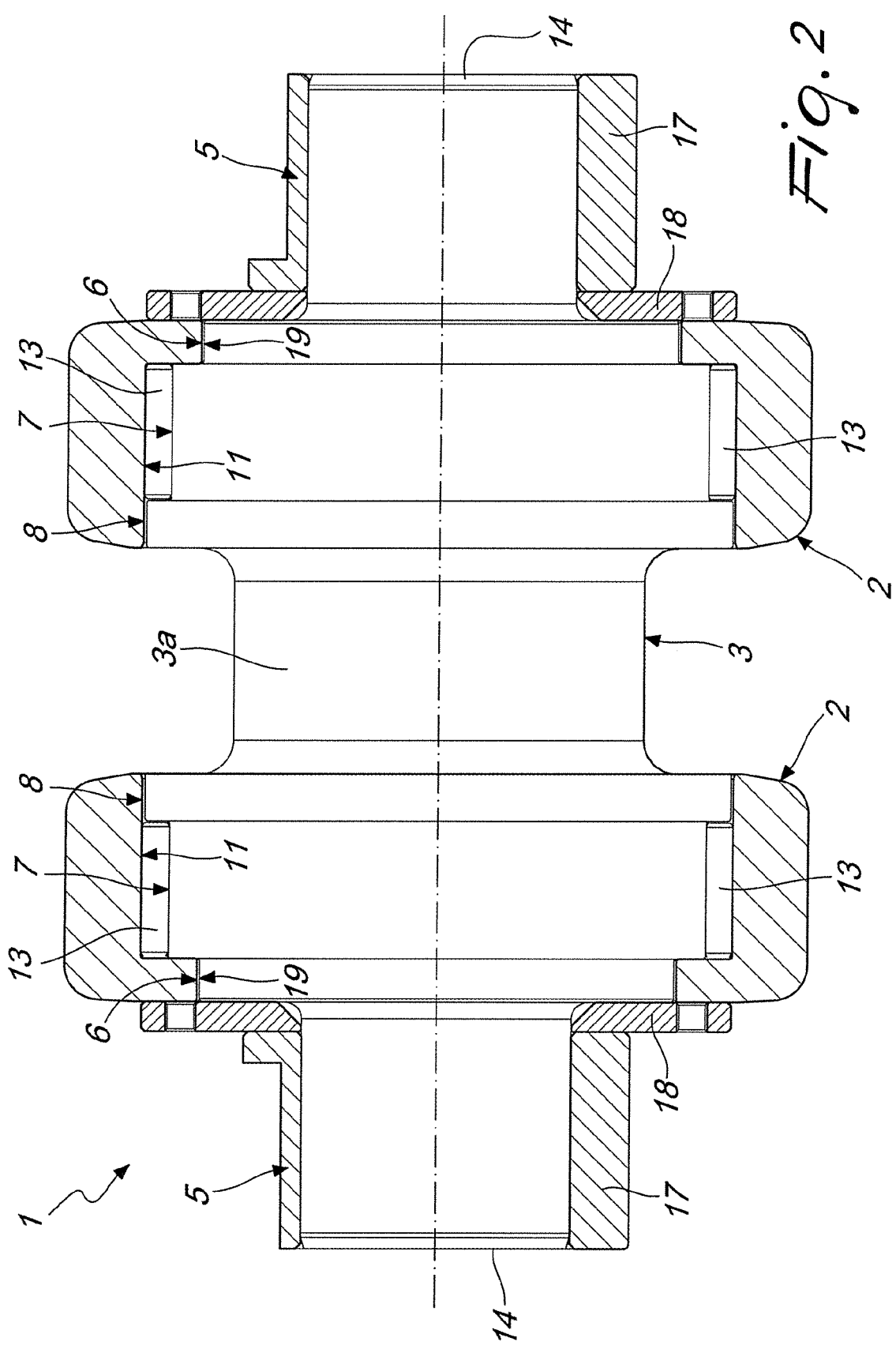
FIG. 2 is a sectional view, taken along a longitudinal plane, of a second version of a support roller for vehicle tracks according to the invention.

With particular reference to an alternative constructive solution (illustrated merely by way of nonlimiting example in FIG. 2), the shaft 3 can usefully comprise two terminal ends 5, which constitute a first segment 5, designed for mating to the chassis of a vehicle. For this mating to the chassis of the installation vehicle, a sleeve 17 is optionally interposed and is keyed (or otherwise fixed) on the terminal ends 5 (first segment 5).

The terminal ends (first segment 5) have a respective first diameter.

The shaft 3, according to the specific embodiment that is being described, furthermore comprises at least one second cylindrical segment 6 which is blended with the region furthest from its end front 14 of one of the terminal ends 5 (first segment 5). Said second segment 6 has a second diameter that is larger than the first diameter (i.e., the diameter of the first segment 5).

The shaft 3 is furthermore provided with at least one third cylindrical segment 7 which is blended with the second segment 6 and has a third diameter that is larger than the second diameter (i.e., the diameter of the second segment 6).

Finally, the shaft 3 validly comprises at least one fourth cylindrical segment 8 which is blended with the third segment 7 and has a fourth diameter that is larger than the third diameter (i.e., the diameter of the third segment 7).

According to this specific embodiment of the shaft 3 of a roller 1 according to the invention, it is specified that the internal cavity of each tubular body advantageously comprises a first portion whose shape and dimensions are complementary to those of the fourth segment 8 of the shaft 3 that constitutes the intermediate portion 11, which in the assembly configuration faces and is proximate to the third segment 7 of the shaft 3 as well.

In this manner, the intermediate portion 11 of the tubular body 2 has a shape and dimensions that are complementary to the segment 8 of the shaft 3 and forms, with the third segment 7 of the shaft 3, the interspace intended to accommodate the rolling elements 13.

It is pointed out that the last constructive solution described so far also comprises at least one closure flange 18, which can be coupled rigidly to the first segment 5 of the shaft 3, for the axial locking of the tubular body 2 on said shaft 3. The fixing of the flange 18 can be obtained by means of a plurality of different methods of a known type: merely by way of nonlimiting example, it is pointed out that in the constructive solution shown in FIG. 2 the flange 18 is kept in the position for retaining the tubular body 2 by virtue of the arrangement of the sleeve 17.

It is specified that the tubular body can furthermore advantageously comprise an additional portion 19, whose shape and dimensions are substantially complementary to those of the second segment 6 of the shaft 3, intended to ensure that the rolling elements 13 are correctly locked axially in the interspace that accommodates them (i.e., preventing the respective escape from the interspace formed between the intermediate portion 11 of the tubular body 2 and the third segment 7 of the shaft 3).

Figure 3:
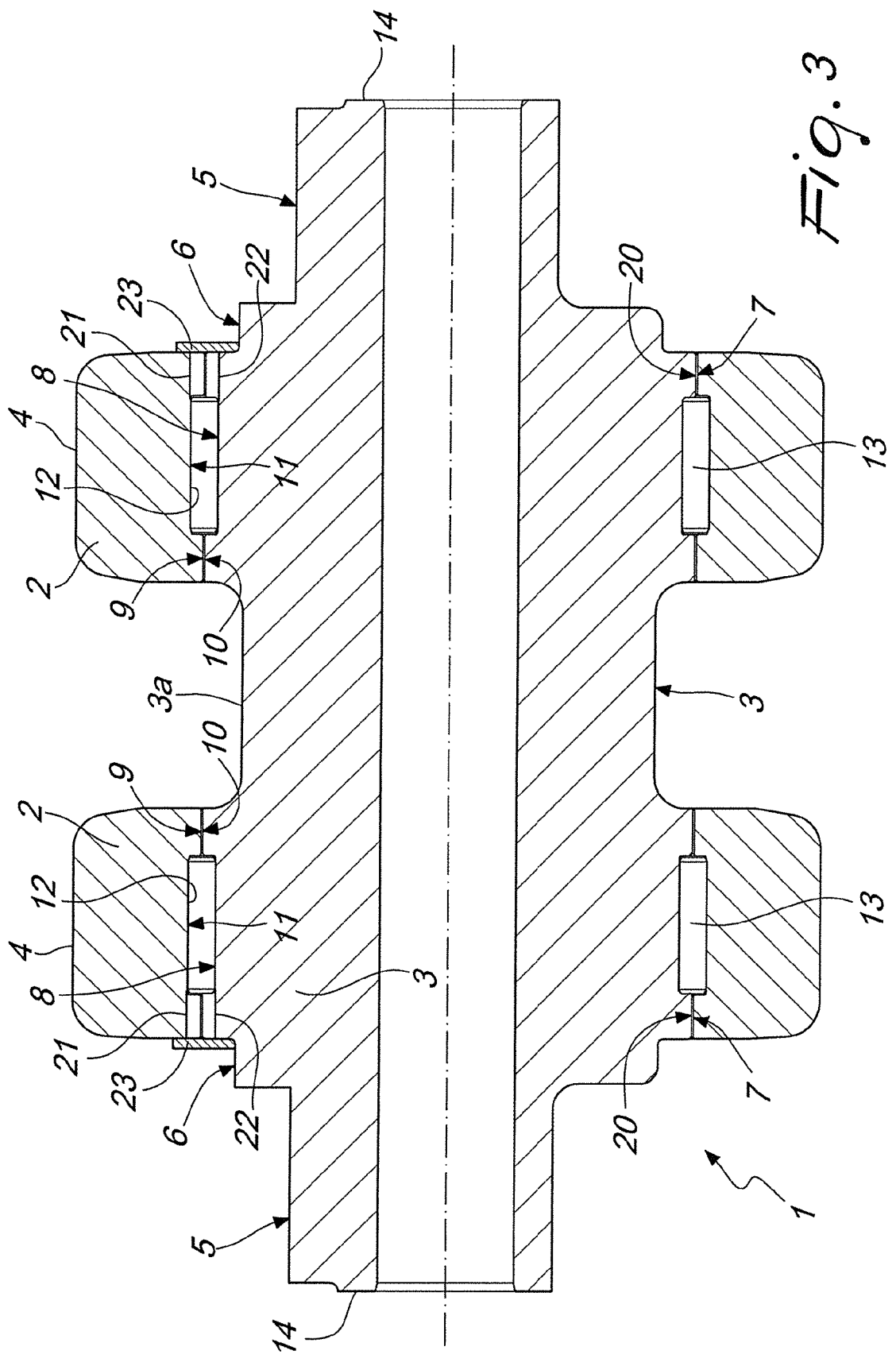
FIG. 3 is a sectional view, taken along a longitudinal plane, of a third version of a support roller for vehicle tracks according to the invention.

With particular reference to a further alternative constructive solution (illustrated merely by way of nonlimiting example in FIG. 3), the shaft 3 can usefully comprise: two terminal ends 5, which constitute a first segment 5, are intended for mating to the chassis of a vehicle, and have a first diameter; at least one second cylindrical segment 6, which is blended with the region furthest from its end front 14 of one of the terminal ends (first segment 5), it is noted that the second segment 6 conveniently has a second diameter that is larger than the first diameter (the one of the first segment 5); at least one third cylindrical segment 7 blended with the second segment 6, which conveniently has a third diameter that is larger than the second diameter (the one of the second segment 6); at least one fourth cylindrical segment 8 blended with the third segment 7, which has a fourth diameter that is smaller than the third diameter (the one of the third segment 7); at least one fifth cylindrical segment 9 blended with the fourth segment 8, which efficiently has a fifth diameter which is equal to the third diameter (the one of the third segment 7).

Again with reference to this further constructive solution, it is specified that the internal cavity of each tubular body 2 comprises: a first portion 10, whose shape and dimensions are complementary to those of the fifth segment 9 of the shaft 3; an intermediate portion 11, which in the assembly configuration faces and is proximate to the fourth segment 8 of the shaft 3 (with respect to which it forms the interspace intended for the accommodation of the rolling elements 13); a last portion 20, whose and dimensions are complementary to those of the third segment 7 of the shaft 3.

It is specified that in this particular embodiment the third segment 7 of the shaft 3 and the last portion 20 of the tubular body 2 comprise respective notches 21 and 22 which, in the mutual alignment configuration, form an opening for the insertion of the rolling elements 13 in the interspace formed between the fourth segment 8 of the shaft 3 and the intermediate portion 11 of the at least one tubular body 2.

This further constructive solution also can advantageously comprise at least one flange 23, which can be coupled rigidly to a second segment 6 of the shaft 3, for the closure of the opening (constituted by the respectively aligned notches 21 and 22) for access to the interspace formed between the fourth segment 8 of the shaft 3 and the intermediate portion 11 of the at least one tubular body 2.

In all of the described constructive solutions, the roller 1 comprises tubular bodies 2 which can rotate freely with respect to the shaft 3 on which they are arranged: the rotation is facilitated by virtue of the presence of the rolling elements 13, which also ensure effective support of transverse loads.

The presence of the rolling elements 13 ensures a very low friction coefficient and for this reason energy losses during motion of the vehicle are reduced, with fuel saving and therefore with a lower environmental impact.

By virtue of the low friction, lubrication with oil is furthermore rendered superfluous and therefore the expensive components intended to provide rotating seals provided in the background art are no longer necessary; the lack of oil also eliminates the risk of leaks, which are the main cause of failure of rollers of the known type, which clearly shows the higher reliability of the new system. As there is no oil, the operation and geometry of the flanges 15, 18 and 23 is simplified and said flanges can in fact be simple screens in order to protect the roller 1 from the entry of abrasive and corrosive elements from the outside.

The described innovation revolutionizes the maintenance procedures of the rollers 1 for earth-moving vehicles, since upon reaching the wear limit of the contact elements it is not necessary to change the entire roller but simply the rotating tubular bodies 2; the economic advantage and also the smaller environmental impact inherent in the inventive concept according to the invention are evident.

The tracked vehicle that mounts this innovation (the roller 1 according to the invention) may increase its movement speed and especially extend its travel time, since the rollers 1 according to the invention do not have the thermal limitations (temperature increase) of the solutions of the background art described previously.

Advantageously, the present invention solves the problems described earlier, proposing a support roller for vehicle tracks 1 that does not require lubrication.

Conveniently, the support roller 1 according to the invention is constituted by low-cost components.

Positively, the support roller 1 according to the invention is suitable to bear intense loads.

Usefully, the support roller 1 according to the invention is scarcely subject to wear.

Validly, the support roller 1 according to the invention is relatively simple to provide in practice and has low costs: these characteristics make the roller 1 according to the invention an innovation of assured application.

The invention thus conceived is susceptible of numerous modifications and variations, all of which are within the scope of the accompanying claims; all the details may furthermore be replaced with other technically equivalent elements.

In the examples of embodiment shown, individual characteristics, given in relation to specific examples, may actually be interchanged with other different characteristics that exist in other examples of embodiment.

In practice, the materials used, as well as the dimensions, may be any according to the requirements and the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A support roller for vehicle tracks, of the type comprising at least one tubular body which can rotate on a supporting shaft which is integral with a chassis of a vehicle, said at least one tubular body being provided with at least one external surface for the temporary accommodation of a portion of an internal face of a respective chain, characterized in that said supporting shaft is symmetrical with respect to a central plane that is transverse and perpendicular to a rotation axis and comprises two symmetrical external contoured regions each comprising at least three consecutive cylindrical segments, having external diameters which are constant and increase progressively from one segment to the next, said two symmetrical external contoured regions being mutually connected by a cylindrical central portion having an external diameter smaller than a segment of said external contoured regions that has the largest diameter; said at least one tubular body comprises a cylindrical internal cavity provided with at least one first portion whose shape and dimensions are usable in combination to those of a segment of one of said two external contoured regions of the supporting shaft that has the largest diameter, wherein said at least one first portion faces said segment of one of said two external contoured regions of the supporting shaft that has the largest diameter, and at least one intermediate portion, which faces and is proximate to, in the assembly configuration, a segment of said one of said two external contoured regions of the supporting shaft having an intermediate diameter, said intermediate portion having a different diameter than said first portion; an annular interspace for the accommodation of a plurality of rolling elements being formed between said segment having an intermediate diameter of said supporting shaft and said at least one intermediate portion of said tubular body.

2. The roller according to claim 1, characterized in that said at least one tubular body comprises two bodies, arranged symmetrically on a respective supporting shaft, each comprising said cylindrical internal cavity provided with said at least one first portion and with said at least one intermediate portion.

3. The roller according to claim 1, characterized in that said supporting shaft comprises: two terminal ends, which constitute a first segment and are intended for mating with the chassis of a vehicle and have a first diameter, at least one second cylindrical segment, which is connected with the region furthest from its end front of one of said terminal ends, at least one second segment having a second diameter that is larger than the first diameter, at least one third cylindrical segment, which is connected with said second segment, at least one third segment having a third diameter that is larger than the second diameter, at least one fourth cylindrical segment, which is connected with said third segment, at least one fourth segment having a fourth diameter that is larger than the third diameter, at least one fifth cylindrical segment, which is connected with said fourth segment, at least one fifth segment having a fifth diameter that is larger than the fourth diameter.

4. The roller according to claim 3, characterized in that the internal cavity of each of said two tubular bodies comprises: said first portion whose shape and dimensions are usable in combination to those of said fifth segment of said shaft; a second portion, whose shape and dimensions are usable in combination to those of said fourth segment of said shaft; said intermediate portion, which in the assembly configuration faces and is proximate to said third segment of said shaft.

5. The roller according to claim 3, characterized in that it comprises at least one closure flange, which can be coupled rigidly to said second segment of said shaft, for the locking of said rolling elements in said interspace formed between said tubular body and said supporting shaft, with consequent prevention of the axial translational motions of said tubular body.

6. The roller according to claim 1, characterized in that said shaft comprises: two terminal ends, which constitute a first segment and are designed to mate with the chassis of a vehicle, optionally with the interposition of a sleeve keyed thereon, which have a first diameter; at least one second cylindrical segment, which is blended with the region furthest from its end front of one of said terminal ends, at least one second segment having a second diameter that is larger than the first diameter; at least one third cylindrical segment, which is blended with said second segment, at least one third segment having a third diameter that is larger than the second diameter; at least one fourth cylindrical segment, which is blended with said third segment, at least one fourth segment having a fourth diameter that is larger than the third diameter.

7. The roller according to claim 6, characterized in that the internal cavity of each said tubular body comprises: said first portion having a shape and dimensions that are complementary to those of said fourth segment of said shaft that constitutes said intermediate portion, which in the assembly configuration faces and is proximate to said third segment of said shaft.

8. The roller according to claim 6, characterized in that it comprises at least one closure flange, which can be coupled rigidly to said first segment of said shaft for the axial locking of said tubular body.

9. The roller according to claim 1, characterized in that said shaft comprises: two terminal ends, which constitute a first segment and are intended for mating with the chassis of a vehicle and have a first diameter; at least one second cylindrical segment, which is blended with the region furthest from its end front of one of said terminal ends, at least one second segment having a second diameter that is larger than the first diameter; at least one third cylindrical segment, which is blended with said second segment, at least one third segment having a third diameter that is larger than the second diameter; at least one fourth cylindrical segment, which is blended with said third segment, at least one fourth portion having a fourth diameter that is larger than the third diameter; at least one fifth cylindrical segment, which is blended with said fourth segment, at least one fifth segment having a fifth diameter that is equal to the third diameter.

10. The roller according to claim 9, characterized in that the internal cavity of each said tubular body comprises: said first portion whose shape and dimensions are complementary to those of said fifth segment of said shaft; said intermediate portion, which in the assembly configuration faces and is proximate to said fourth segment of said shaft; a last portion, whose shape and dimensions are complementary to those of said third segment of said shaft; said third segment and said last portion comprising respective notches which, in the mutual alignment configuration, form an opening for the insertion of said rolling elements in the interspace formed between said fourth segment of said shaft and said intermediate portion of said at least one tubular body.

11. The roller according to claim 9, characterized in that it comprises at least one flange, which can be coupled rigidly to said second segment of said shaft, for the closure of said opening for accessing said interspace formed between said fourth segment of said shaft and said intermediate portion of said at least one tubular body.

\* \* \* \* \*